Feb. 2, 1954 P. H. TAYLOR 2,668,049
SPRING UTILIZING A COMPRESSIBLE SOLID
Filed April 16, 1952
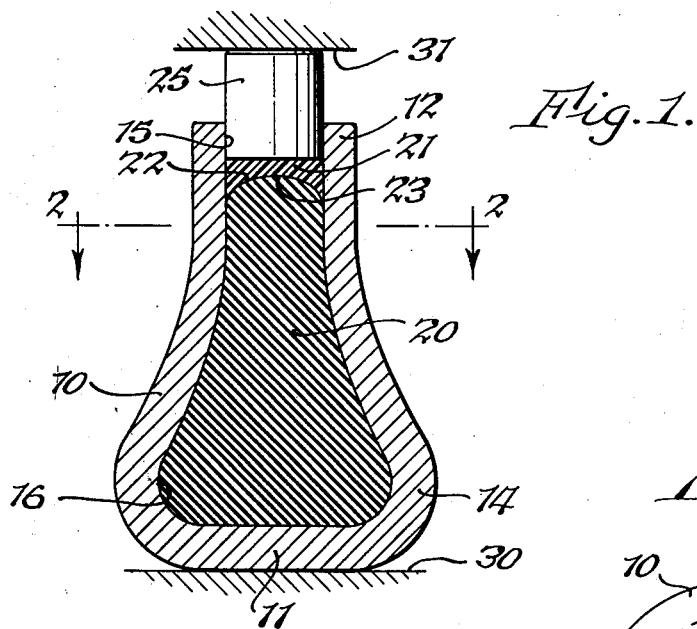
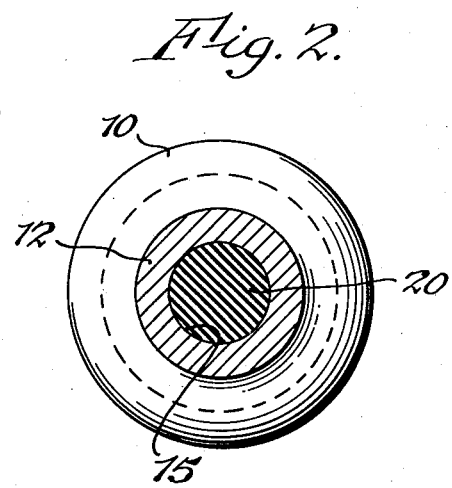
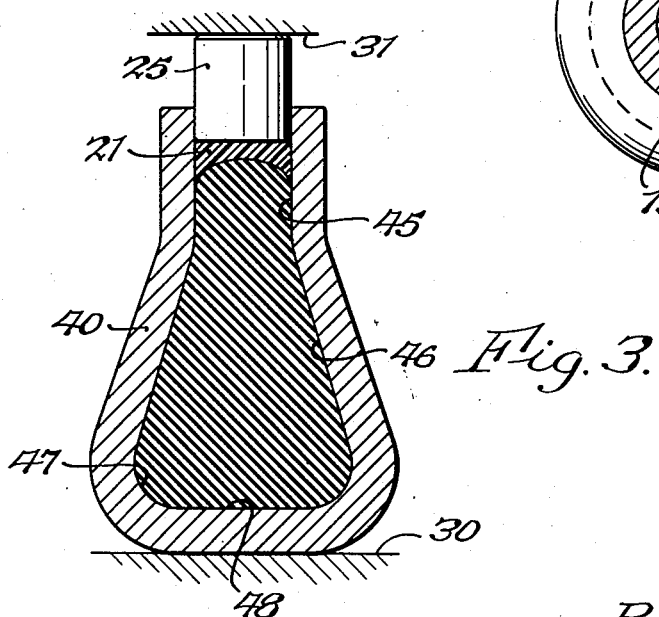
INVENTOR.
Paul H. Taylor
BY
Attorney.

Patented Feb. 2, 1954

2,668,049

UNITED STATES PATENT OFFICE 2,668,049

SPRING UTILIZING A COMPRESSIBLE SOLID

Paul H. Taylor, Grand Island, N. Y., assignor to Wales-Strippit Corporation, North Tonawanda, N. Y., a corporation of New York Application April 16, 1952, Serial No. 282,512

10 Claims. (Cl. 267—1)

The present invention relates to springs, and more particularly springs which make use of the compressibility of solids to achieve their purposes. In a more specific aspect the invention relates to a spring of the type disclosed in my copending U. S. patent application Serial No. 272,878, filed February 21, 1952.

In the spring of the present invention, as in the spring of my prior application above mentioned, resiliency is obtained through use of a compressible solid in the form of a column or body. Preferably a plastic, such as a dense and hard silicone is used, although other plastics, such as Lucite, polystyrene, cellulose acetate, nylon, etc, can be employed also, depending on the loads desired.

The compressible material is placed within a hollow container which is closed at one end and has a piston mounted to reciprocate in its other, open end. The container seats at its closed end against one of the two relatively movable parts between which the spring is interposed; and the piston contacts the other of said parts. When a working load is applied to the spring the compressible material is compressed to absorb the load, and to return the piston, by increase in volume again, when the load is relieved.

Springs of this nature can be made much more compact for a given load-carrying capacity than can mechanical springs, such as coil or leaf springs. For this reason they have definite advantages for use in automobiles and in machine tools, such as punch presses. These springs have advantages over liquid springs, also, in that they do not have the difficult sealing problem attendant upon use of a liquid, since the tendency of a solid to extrude past a gap in the seal is much less than the tendency of liquid to pass a seal. Liquid wets the cylinder wall and some unavoidably escapes past the seal in the operation of the spring, whereas the solid material tends to maintain itself as a homogeneous mass if ordinary precautions regarding use of the material in a spring are taken. Furthermore the solid type spring is much less subject to variation in spring pressure with variation in temperature. These springs have definite advantages, also, for airplane use because, having relatively great load-carrying capacity for relatively small size, they permit reduction of the weight penalty of the springs used to a minimum. These springs have the further advantage that their fatigue life is for all practical purposes substantially endless. These and other advantages of springs which make use of the compressibility of solids to achieve their purposes, are described at length in my application Serial No. 272,878 above mentioned.

One object of the present invention is to provide a spring, of the type employing a compressible solid as the resilient medium, which has a greater stroke than the spring disclosed in my application above mentioned.

Another object of the invention is to provide a spring, employing a compressible solid, in which the forces of compression applied thereto are equally distributed over the compressible material.

Another object of the invention is to provide a spring of the character described in which the forces acting on the compressible solid are equally distributed but in which a greater volume of compressible material may be employed for a given height of spring.

Another object of the invention is to provide a spring employing a compressible solid which is so constructed that the friction on the solid is reduced as compared with the design specifically disclosed in my prior application above-mentioned, thereby to permit quicker return of the spring to normal condition after the forces of compression have been removed.

Still another object of the invention is to provide a spring of the character described using a compressible solid in compression which may contain a greater volume of the compressible material, but which is nevertheless adapted to be nested with other identically-constructed springs to permit mounting a maximum number of springs within a given area.

Other objects of the invention will be apparent hereinafter from the specification and from the recital of the appended claims.

In the drawing:

Fig. 1 is an axial section of a spring utilizing a compressible solid and constructed according to one embodiment of this invention;

Fig. 2 is a section through this spring taken on the line 2—2 of Fig. 1 and looking in the direction of the arrows; and Fig. 3 is a section similar to Fig. 1 showing a modified form of the device.

Referring now to the drawing by numerals of reference, and first to Figs. 1 and 2, the spring shown comprises a hollow container 10 which is closed at its bottom 11 and which is open at its opposite end. This container is more or less bulbous in shape. It is substantially cylindrical in its upper portion 12 and gradually curves outwardly to an enlarged section 14 just above its base 11. The upper portion 15 of the bore of this container is cylindrical; and the inside wall 16 of the container gradually curves outwardly below the cylindrical portion of its bore, following generally the contour of the outside of the container itself. However, the wall thickness of the container 10 increases from the cylindrical portion 12 to the enlarged bellied portion 14 so as to provide the requisite strength in the container wall for the different diameters of the compressible solid which it is intended to contain.

Disposed within the container is a compressible solid material 20 such as hard silicone, polystyrene, etc. This compressible solid 20 is ordinarily pre-loaded so that it fills the inside of the bore of the container 10. The column 20 has a spherical upper end 22 on which is mounted a solid seal 21 made of extra-tough structural nylon or other suitable plastic. The seal 21 is elastic and compressible but less elastic and less compressible than the plastic column 20. The seal 21 has a concave spherical under-surface 23 to fit the convex spherical upper end 22 of the compressible solid 20. A piston 25 made of a metal sufficiently strong to withstand the pressures involved, preferably steel or brass, tops the assembly, and is mounted to reciprocate within the cylindrical portion 15 of the bore of the container. It has a plane under-face resting upon the plane upper face of the seal 21.

In unloaded condition the column 20 of plastic material is somewhat smaller than the container so that there is a clearance between the column 20 and the inside wall of the receptacle when the spring is completely at rest without load. The seal 21, however, has a tight fit within the cylindrical portion 15 of the bore of the container, and preferably is even normally slightly larger in diameter than the bore portion 15 so that compression is required in order to insert it in the bore.

The spring is adapted to be preloaded in use. It is mounted between the two relatively movable parts with which it is adapted to be used, such as the bed 30 and the ram 31 of a press. The spring may be preloaded by dimensioning it so that even when the ram 31 is in withdrawn position the ram will exert a pressure through the piston 25 and seal 21 on the compressible solid 20 to distort the solid and cause the material which is somewhat elastic, to fill the container, thereby placing the material under preload.

Preload of the spring occurs, therefore, through distortion of the plastic which is the conventional way in which rubber is used as an elastic spring material. In a spring made according to the present invention, preload is obtained by absorbing energy in the plastic to distort the column from its normal shape to cause the plastic material to fill the container. Of necessity this distortion produces a light load because distortion within the elastic limit of the material provides very low forces.

In operation, movement of the ram 31 toward the bed 30 forces the piston 25 inwardly of the container 10. Since the solid 20 is already under preload, and therefore already completely fills the inside of the chamber 10, the motion of the ram toward the bed effects compression of the molecules of the plastic to such a point that the volume of the column is actually reduced. It has been found that in the case of hard silicones a net reduction of approximately 6% can be expected along with an internal pressure of 20,000 p. s. i. in the plastic. This in turn provides roughly a force of approximately 8,000 pounds on a ¾ inch piston which can be utilized for resilient action.

The enlargement of the chamber 10 is gradual so that the forces of compression on the solid material are easily transmitted to the enlarged portion 16 of the chamber so that all the solid material is effective in operation. A feature of the inverted generally conical shape of the container is that the friction on the material is less than where the chamber is straight-walled because the reverse conical shape assists flow of the compressible material more readily after the forces of compression have been removed. This results in a smaller differential between the compressed and expanding forces accountable from this spring. Not as much of work is lost in friction. Furthermore, the enlarged section of the chamber permits of getting more compressible solid in the chamber and yet insures that the lines of force from the piston move out gradually as the material is compressed.

Fig. 3 shows a modification of the invention employing a container 40 whose upper portion has a straight-walled cylindrical bore 45 as in the previously described embodiment of the invention, but whose lower portion has a bore 46 which is straight-walled and which is more nearly conical than the bore portion 16 of the first described embodiment. The bore is rounded only in the part 47 which connects the straight-walled inclined portion 46 with the bottom 48 of the chamber of the vessel. It will be noted that the wall-thickness of the container again increases with increase in its diameter, the wall thickness being least in the cylindrical upper portion. The embodiment of Fig. 3 is simpler to make.

Either of the embodiments of the invention can be employed in nested fashion, the piston 25 of one spring engaging the ram 30, and the base 11 of this spring engaging the bed 30, whereas an adjacent spring or springs at opposite sides of the spring mentioned may have their bases engaging the ram and their pistons engaging the bed so that a plurality of springs can be placed very closely together to carry a maximum load.

While other materials than hard silicone may be utilized in a spring made according to this invention it is economically desirable to use materials having the greatest compressibility, such as the hard silicones, which, as stated, have a minimum compressibility of about 6%. In addition, there is another reason for using silicones, that is, in operation of a spring made according to the present invention, the working of the solid material therein will of necessity produce heat. Silicones have a natural resistance to high heat and their use in a spring of the character herein described is particularly advantageous because silicones do not deteriorate from heat, and heat does not have any deleterious effects on such materials even in the presence of the lubricants used.

The seal is made preferably of nylon or a similar material, when a silicone solid is used in the spring, because it has been found that the silicones tend to cause seizure and scoring when they get between relatively movable parts made of ferrous material, whereas nylon remains unaffected.

While the invention has been described in connection with the embodiment thereof in a press, it will be obvious that the spring of this invention may be employed in various applications where it is desired to resiliently support one part upon another, or it is desired to use resilient means for returning one part after movement of that part toward another. The device of the present invention is particularly useful where conventional mechanical springs formed of steel wire or steel leafs provide insufficient power and yet where the cost of liquid springs is prohibitive. The invention has application, however, wherever mechanical springs are at present employed.

While the invention has been described in connection with particular embodiments thereof and particular uses therefor, then, it will be understood that it is capable of further modification and use; and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A spring comprising a hollow container having a chamber therein which is closed at one end and which is open at its other end, a piston reciprocable through the open end of said chamber, and a compressible, solid plastic member interposed between said piston and the closed end of said chamber, said chamber being of greater diameter adjacent its closed end than adjacent its open end, said spring being adapted to be preloaded for use so that said plastic member is distorted elastically to fill said chamber, whereby under further working load the volume of said plastic member is reduced to stored energy to effect return of said piston upon release of said working load.

2. A spring comprising a hollow container having a chamber therein which is closed at one end and which is open at its other end, a piston reciprocable through the open end of said chamber, and a compressible, solid plastic member interposed between said piston and the closed end of said chamber, said piston being cylindrical in the portion thereof that fits into said chamber, said chamber having a corresponding cylindrical bore portion adjacent its open end to receive and guide said piston, and said chamber being of larger diameter below its cylindrical bore portion, said spring being adapted to be preloaded for use so that said plastic member is distorted elastically to fill said chamber, whereby upon further working load the volume of said plastic member is reduced to store energy to effect return of said piston upon release of said working load.

3. A spring comprising a hollow container having a chamber therein which is closed at one end and which is open at its other end, a piston reciprocable through the open end of said chamber, and a compressible, solid plastic member interposed between said piston and the closed end of said chamber, said piston being cylindrical in the portion thereof that fits into said chamber, said chamber having a corresponding cylindrical bore portion adjacent its open end to receive and guide said piston, and said chamber being of gradually increasing diameter below its cylindrical bore portion, said spring being adapted to be preloaded for use so that said plastic member is distorted elastically to fill said chamber, whereby upon further working load the volume of said plastic member is reduced to store energy to effect return of said piston upon release of said working load.

4. A spring comprising a hollow container having a chamber therein which is closed at one end and which is open at its other end, a piston reciprocable through the open end of said chamber, and a compressible, solid plastic member interposed between said piston and the closed end of said chamber, said piston being cylindrical in the portion thereof that fits into said chamber, said chamber having a corresponding cylindrical bore portion adjacent its open end to receive and guide said piston, and said chamber being of generally conical shape below said cylindrical portion and increasing in diameter from said cylindrical portion toward the closed end of the container, said spring being adapted to be preloaded for use so that said plastic member is distorted elastically to fill said chamber, whereby upon further working load the volume of said plastic member is reduced to store energy to effect return of said piston upon release of said working load.

5. A spring comprising a hollow container having a chamber therein which is closed at one end and which is open at its other end, a piston reciprocable through the open end of said chamber, and a compressible, solid plastic member interposed between said piston and the closed end of said chamber, said chamber being of greater diameter adjacent its closed end than adjacent its open end, and said container having a greater wall thickness where the chamber is of greater diameter, said spring being adapted to be preloaded for use so that said plastic member is distorted elastically to fill said chamber, whereby upon further working load the volume of said plastic member is reduced to store energy to effect return of said piston upon release of said working load.

6. A spring comprising a hollow container having a chamber therein which is closed at one end and which is open at its other end, a piston reciprocable through the open end of said chamber, and a compressible, solid plastic member interposed between said piston and the closed end of said chamber, said piston being cylindrical in the portion thereof that fits into said chamber, said chamber having a corresponding cylindrical bore portion adjacent its open end to receive and guide said piston, and said chamber being of gradually increasing diameter below its cylindrical bore portion, and the wall thickness of said container increasing with increase in diameter of the chamber, said spring being adapted to be preloaded for use so that said plastic member is distorted elastically to fill said chamber, whereby upon further working load the volume of said plastic member is reduced to store energy to effect return of said piston upon release of said working load.

7. A spring comprising a hollow container which is closed at one end and open at its other end, the bore of said container being cylindrical adjacent its open end and increasing in diameter below its cylindrical portion toward its closed end, a piston reciprocable through the open end of said container and having a cylindrical peripheral surface to reciprocate in the cylindrical portion of the bore of said container, a compressible, solid, plastic member in said container, said plastic member seating at one end against the closed end of said container, and a sealing member interposed between the other end of said plastic member and said piston to prevent extrusion of said plastic member through the open end of said container, said sealing member having a cylindrical outside surface closely fitting the cylindrical portion of the bore of said container, said spring being adapted to be used under preload, and said plastic member under such preload filling completely the space in said chamber between said sealing member and the closed end of said chamber, whereby upon movement of said piston inwardly of said chamber under working load said plastic member is compressed and reduced in volume to store energy for returning said piston upon release of said working load.

8. A spring comprising a hollow container which is closed at one end and open at its other end, the bore of said container being cylindrical adjacent its open end and increasing in diameter below its cylindrical portion toward its closed end, a piston reciprocable through the open end of said container and having a cylindrical peripheral surface to reciprocate in the cylindrical portion of the bore of said container, a compressible, solid, plastic member in said container, said plastic member seating at one end against the closed end of said container, and a sealing member interposed between the other end of said plastic member and said piston to prevent extrusion of said plastic member through the open end of said container, said sealing member having a cylindrical outside surface closely fitting the cylindrical portion of the bore of said container, and said container having a wall-thickness which increases in thickness with increase in diameter of the bore of the container, said spring being adapted to be used under preload, and said plastic member under such preload filling completely the space in said chamber between said sealing member and the closed end of said chamber, whereby upon movement of said piston inwardly of said chamber under working load said plastic member is compressed and reduced in volume to store energy for returning said piston upon release of said working load.

9. A spring comprising a hollow container which is closed at one end and open at its other end, the bore of said container being cylindrical adjacent its open end and increasing in diameter below its cylindrical portion toward its closed end, a piston reciprocable through the open end of said container and having a plane inner face and a cylindrical peripheral surface and being adapted to reciprocate in the cylindrical portion of the bore of said container, a compressible, solid plastic member in said container, said plastic member seating at one end against the closed end of said container and having its other end spherical in shape, and a solid, structural plastic sealing member interposed between the other end of said plastic member and said piston to prevent extrusion of said plastic member through the open end of said container, said sealing member having at one side a spherical face complementary to and seated on said other end of said plastic member and having at its other side a plane face against which the plane inner face of said piston seats, said spring being adapted to be preloaded for use so that said plastic member fills said container, whereby under further working load said plastic member is compressed.

10. A spring comprising a hollow container which is closed at one end and open at its other end, the bore of said container being cylindrical adjacent its open end and increasing in diameter below its cylindrical portion toward its closed end, a piston reciprocable through the open end of said container and having a plane inner face and a cylindrical peripheral surface and being adapted to reciprocate in the cylindrical portion of the bore of said container, a compressible, solid plastic member in said container, said plastic member seating at one end against the closed end of said container and having its other end spherical in shape, and a solid, structural plastic sealing member interposed between the other end of said plastic member and said piston to prevent extrusion of said plastic member through the open end of said container, said sealing member having at one side a spherical face complementary to and seated on said other end of said plastic member and having at its other side a plane face against which the plane inner face of said piston seats, said spring being adapted to be preloaded for use so that said plastic member fills said container, whereby under further working load said plastic member is compressed, and said container having a wall thickness increasing with increase in diameter of the bore of said container.

PAUL H. TAYLOR.

References Cited in the file of this patent

UNITED STATES PATENTS

| Number | Name | Date |
| --- | --- | --- |
| 57,647 | Wilder | Aug. 28, 1866 |
| 1,370,880 | Clawson et al. | Mar. 8, 1921 |
| 1,461,091 | Henley | July 10, 1923 |
| 2,356,563 | Bingham | Aug. 22, 1944 |
| 2,570,854 | Pierce | Oct. 9, 1951 |